(12) United States Patent
Lee

(10) Patent No.: US 11,703,662 B2
(45) Date of Patent: Jul. 18, 2023

(54) FIVE-PIECE OPTICAL LENS SYSTEM WITH A WIDE FIELD OF VIEW

(71) Applicant: NEWMAX TECHNOLOGY CO., LTD., Taichung (TW)

(72) Inventor: Chun-Sheng Lee, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 323 days.

(21) Appl. No.: 17/023,339

(22) Filed: Sep. 16, 2020

(65) Prior Publication Data

US 2021/0382274 A1 Dec. 9, 2021

(30) Foreign Application Priority Data

Jun. 4, 2020 (TW) .................................. 109118758

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
None
See application file for complete search history.

(56) References Cited

U.S. PATENT DOCUMENTS

| 8,335,043 | B2 | 12/2012 | Huang |
| 8,395,853 | B2 | 3/2013 | Chen et al. |
| 8,576,497 | B2 | 11/2013 | Hsu et al. |
| 8,593,737 | B2 | 11/2013 | Tang et al. |
| 2016/0131875 | A1* | 5/2016 | Hsu ..................... G02B 27/0025 348/340 |
| 2017/0205605 | A1* | 7/2017 | Hsu ..................... G02B 27/0025 |
| 2021/0132334 | A1* | 5/2021 | Lin .......................... G02B 9/60 |

* cited by examiner

*Primary Examiner* — Darryl J Collins
(74) *Attorney, Agent, or Firm* — Bruce Stone LLP; Joseph A. Bruce

(57) ABSTRACT

A five-piece optical lens system with a wide field of view includes, in order from the object side to the image side: a first lens element with a negative refractive power, a stop, a second lens element with a positive refractive power, a third lens element with a negative refractive power, a fourth lens element with a positive refractive power, a fifth lens element with a negative refractive power, wherein a central thickness of the first lens element along an optical axis is CT1, a central thickness of the third lens element along the optical axis is CT3, a central thickness of the fourth lens element along the optical axis is CT4, a central thickness of the fifth lens element along the optical axis is CT5, satisfying the relations: $0.69<CT4/(CT1+CT3+CT5)<1.32$, $1.83<(CT1+CT5)/CT3<4.06$. Such a system has a wide field of view, high resolution, short length, less distortion taking into account lens production.

10 Claims, 10 Drawing Sheets

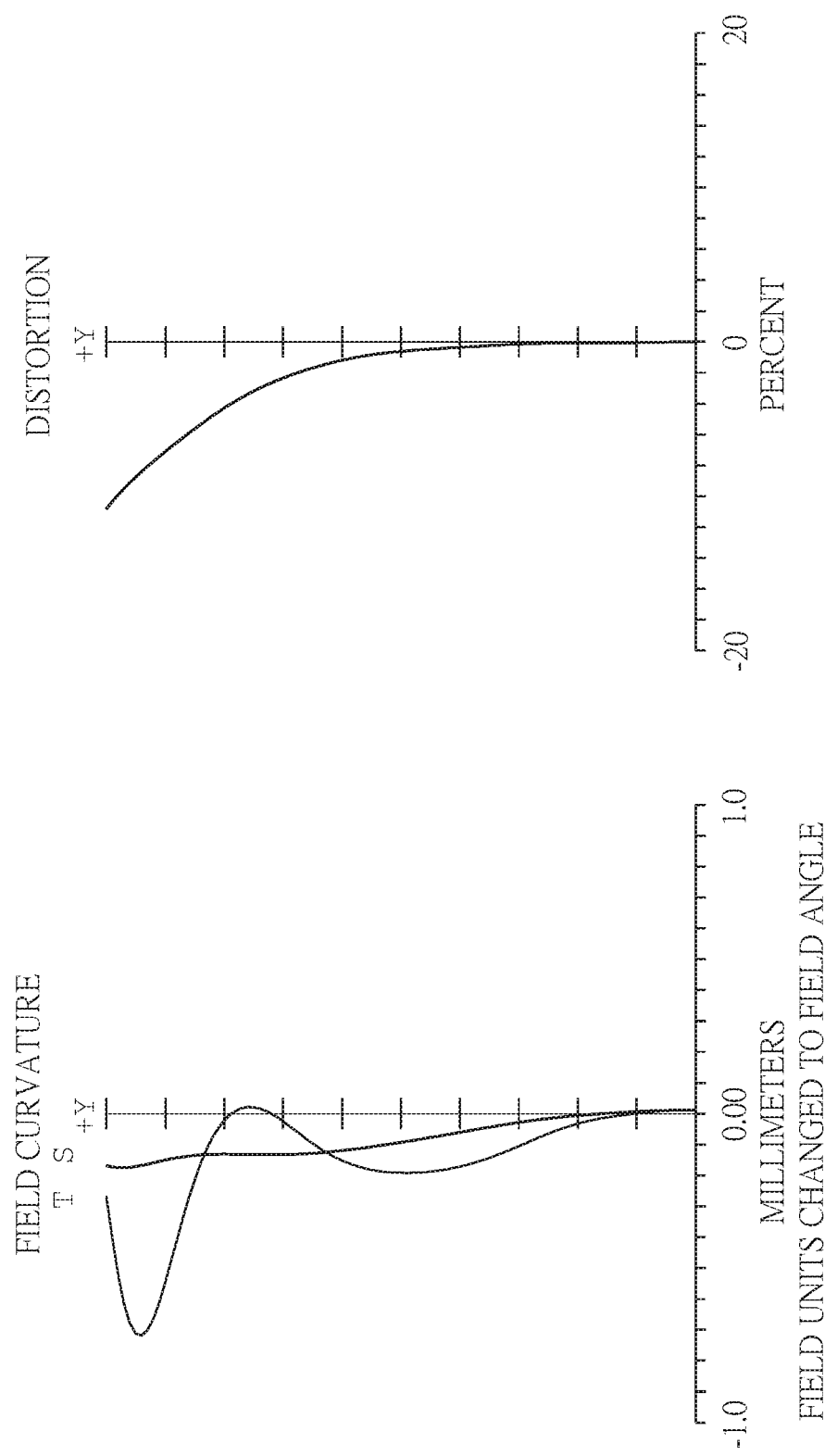

FIVE-PIECE OPTICAL LENS SYSTEM WITH A WIDE FIELD OF VIEW

BACKGROUND

Field of the Invention

The present invention relates to a five-piece optical lens system with a wide field of view, and more particularly to a miniaturized five-piece optical lens system with a wide field of view which is applicable to electronic products.

Description of the Prior Art

With the development of high-standard mobile devices, such as, smartphone, tablet computer and so on, miniaturized optical lens systems with high resolution have become the standard equipment. In addition, with the popular of social networks, more and more people like to take photographs or take selves and share with others, and recreational machine, driving recorder, security camera lens and so on need wider angle of view, therefore, there's an increasing demand for angle of view and image quality. For example, the optical lens systems as disclosed in U.S. Pat. Nos. 8,335,043 and 8,576,497 use two lens groups and 5-6 pieces of lens elements to obtain a wide field of view, however, their distortion is increased. The optical lens systems as disclosed in U.S. Pat. Nos. 8,593,737, 8,576,497 and 8,395,853 are all provided with a maximal field of view (FOV) that is smaller than 85 degrees, and their TL (total length) of the entire optical lens system is also too long.

Additionally, optical lens systems which used in biomedical, driving recorder, camera or other electronic products do not need to have too large stop, instead, the demand for the field of view and total length is what the industry needs to solve. Conventional lens systems used in the electronic products in the aforementioned areas mostly consist of four lens elements, however, the field of view is insufficient and the total length is too long.

The present invention mitigates and/or obviates the aforementioned disadvantages.

SUMMARY

The primary objective of the present invention is to provide a five-piece optical lens system which has a wide field of view, high resolution, short length and less distortion taking into account lens production.

Therefore, a five-piece optical lens system with a wide field of view in accordance with the present invention comprises a stop and a lens group having five lens elements, in order from an object side to an image side: a first lens element with a negative refractive power having an object-side surface being convex near an optical axis and an image-side surface being concave near the optical axis, at least one of the object-side surface and the image-side surface of the first lens element being aspheric; the stop; a second lens element with a positive refractive power having an object-side surface being convex near the optical axis and an image-side surface being convex near the optical axis, at least one of the object-side surface and the image-side surface of the second lens element being aspheric; a third lens element with a negative refractive power having an object-side surface being convex near the optical axis and an image-side surface being concave near the optical axis, at least one of the object-side surface and the image-side surface of the third lens element being aspheric; a fourth lens element with a positive refractive power having an object-side surface being concave near the optical axis and an image-side surface being convex near the optical axis, at least one of the object-side surface and the image-side surface of the fourth lens element being aspheric; and a fifth lens element with a negative refractive power having an object-side surface being convex near the optical axis and an image-side surface being concave near the optical axis, at least one of the object-side surface and the image-side surface of the fifth lens element being aspheric and provided with at least one inflection point.

Wherein a central thickness of the first lens element along the optical axis is CT1, a central thickness of the third lens element along the optical axis is CT3, a central thickness of the fourth lens element along the optical axis is CT4, a central thickness of the fifth lens element along the optical axis is CT5, and they satisfy the relations: $0.69 < CT4/(CT1+CT3+CT5) < 1.32$ and $1.83 < (CT1+CT5)/CT3 < 4.06$.

Therefore, when $CT4/(CT1+CT3+CT5)$ satisfies the above relation, it can balance the thickness distribution of the lens elements of the five-piece optical lens system with a wide field of view, so as to avoid the improper use of space due to the large difference of lens thickness, and also can enhance the system control ability of the fourth lens element. When $(CT1+CT5)/CT3$ satisfies the above relation, it can balance the thickness distribution of the lens elements of the five-piece optical lens system with a wide field of view, so as to avoid the improper use of space due to the large difference of lens thickness, and also can enhance the system control ability of the third lens element.

Preferably, a focal length of the five-piece optical lens system with a wide field of view is f, a focal length of the fourth lens element is f4, and they satisfy the relation: $1.14 < f/f4 < 1.96$, which can avoid too strong refractive power of the fourth lens element, so as to maintain a large imaging range on an image plane.

Preferably, a focal length of the second lens element, the third lens element, the fourth lens element and the fifth lens element combined is f2345, the focal length of the five-piece optical lens system with a wide field of view is f, and they satisfy the relation: $0.91 < f/f2345 < 1.46$, so that a wide field of view can be provided and the resolution can be improved evidently.

Preferably, a focal length of the third lens element is f3, the focal length of the fourth lens element is f4, and they satisfy the relation: $-28.92 < f3/f4 < -3.41$, which can adjust the ratio of refractive power between the third lens element and the fourth lens element, so as to shorten the total length and correct the spherical aberration and the chromatic aberration.

Preferably, the focal length of the fourth lens element is f4, a focal length of the fifth lens element is f5, and they satisfy the relation: $-1.63 < f5/f4 < -0.87$, so that the distribution of the refractive power will be appropriate, so as to reduce the sensitivity of the imaging optical lens system effectively.

Preferably, the central thickness of the fourth lens element along the optical axis is CT4, the central thickness of the third lens element along the optical axis is CT3, and they satisfy the relation: $2.89 < CT4/CT3 < 4.82$, which can adjust the thickness ratio of the fourth lens element and the third lens element, so as to balance the spatial distribution of the five-piece optical lens system with a wide field of view, thus improving the yield rate and quality.

Preferably, a central thickness of the second lens element along the optical axis is CT2, the central thickness of the third lens element along the optical axis is CT3, and they satisfy the relation: 1.9<CT2/CT3<3.36, which can adjust the thickness ratio of the second lens element and the third lens element, so as to balance the spatial distribution of the five-piece optical lens system with a wide field of view, thus improving the yield rate and quality.

Preferably, the central thickness of the fifth lens element along the optical axis is CT5, the central thickness of the third lens element along the optical axis is CT3, and they satisfy the relation: 1.07<CT5/CT3<2.69, which can adjust the thickness ratio of the fifth lens element and the third lens element, so as to balance the spatial distribution of the five-piece optical lens system with a wide field of view, thus improving the yield rate and quality.

Preferably, the central thickness of the fourth lens element along the optical axis is CT4, the central thickness of the first lens element along the optical axis is CT1, and they satisfy the relation: 2.64<CT4/CT1<4.53, which can adjust the thickness ratio of the fourth lens element and the first lens element, so as to balance the spatial distribution of the five-piece optical lens system with a wide field of view, thus improving the yield rate and quality.

Preferably, the focal length of the second lens element, the third lens element, the fourth lens element and the fifth lens element combined is f2345, half of an image height that can be captured by the five-piece optical lens system with a wide field of view on the image plane is IMH, and they satisfy the relation: 1.21<IMH/f2345<1.94, so that the reducing of the volume of the system and the increasing of the image plane area can be balanced.

Preferably, the focal length of the five-piece optical lens system with a wide field of view is f, half of an image height that can be captured by the five-piece optical lens system with a wide field of view on the image plane is IMH, and they satisfy the relation: 1.06<IMH/f<1.59, so that the reducing of the volume of the system and the increasing of the image plane area can be balanced.

Preferably, a distance from the image-side surface of the fifth lens element to the image plane along the optical axis is BFL, the focal length of the five-piece optical lens system with a wide field of view is f, and they satisfy the relation: 1.11<f/BFL<2.22, so that the reducing of the volume of the system and the increasing of the image plane area can be balanced.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 3B shows the image plane curve and the distortion curve of the third embodiment of the present invention;

DETAILED DESCRIPTION

Figure 1A:
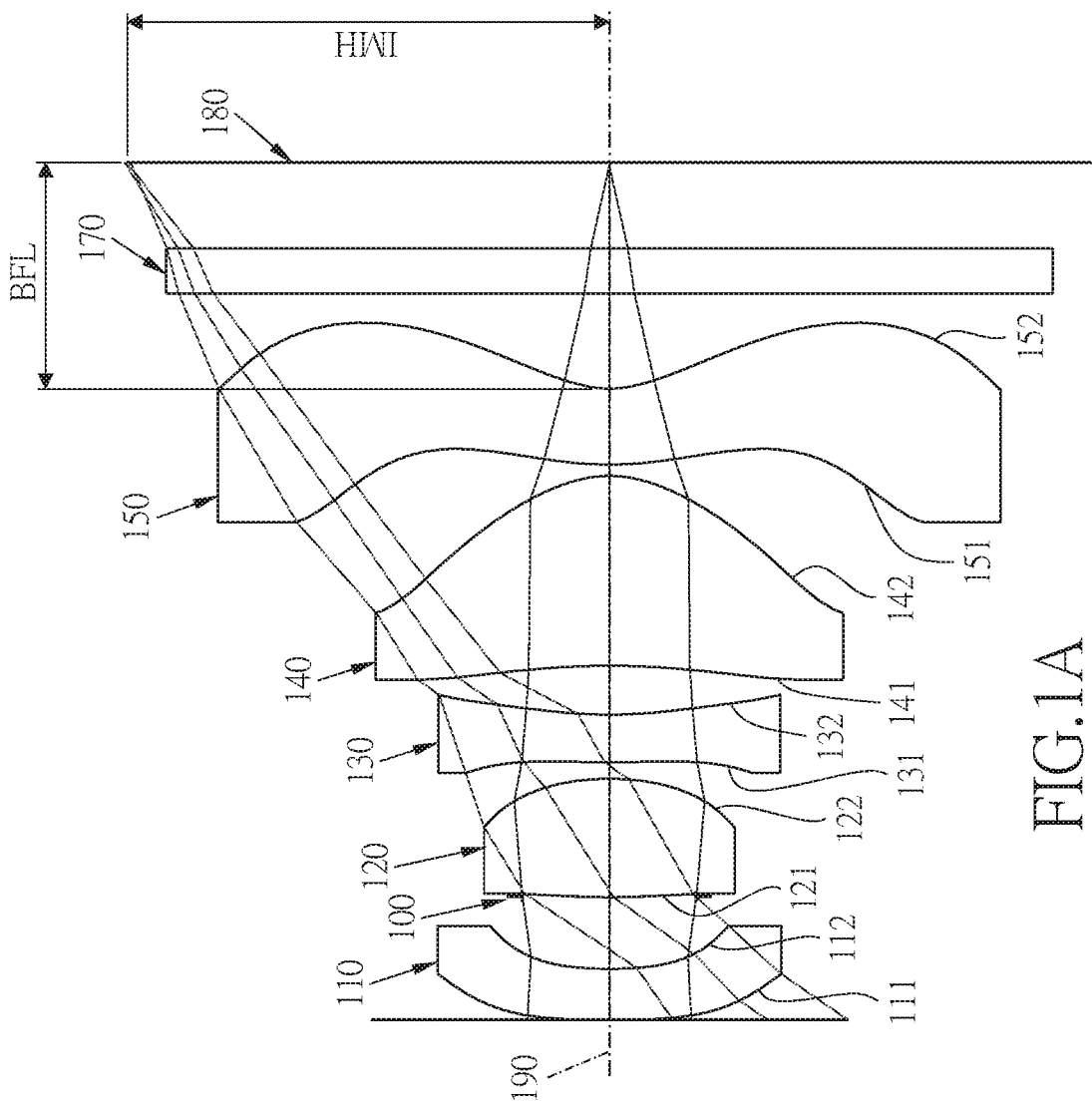
FIG. 1A shows a five-piece optical lens system with a wide field of view in accordance with a first embodiment of the present invention.
Figure 1B:
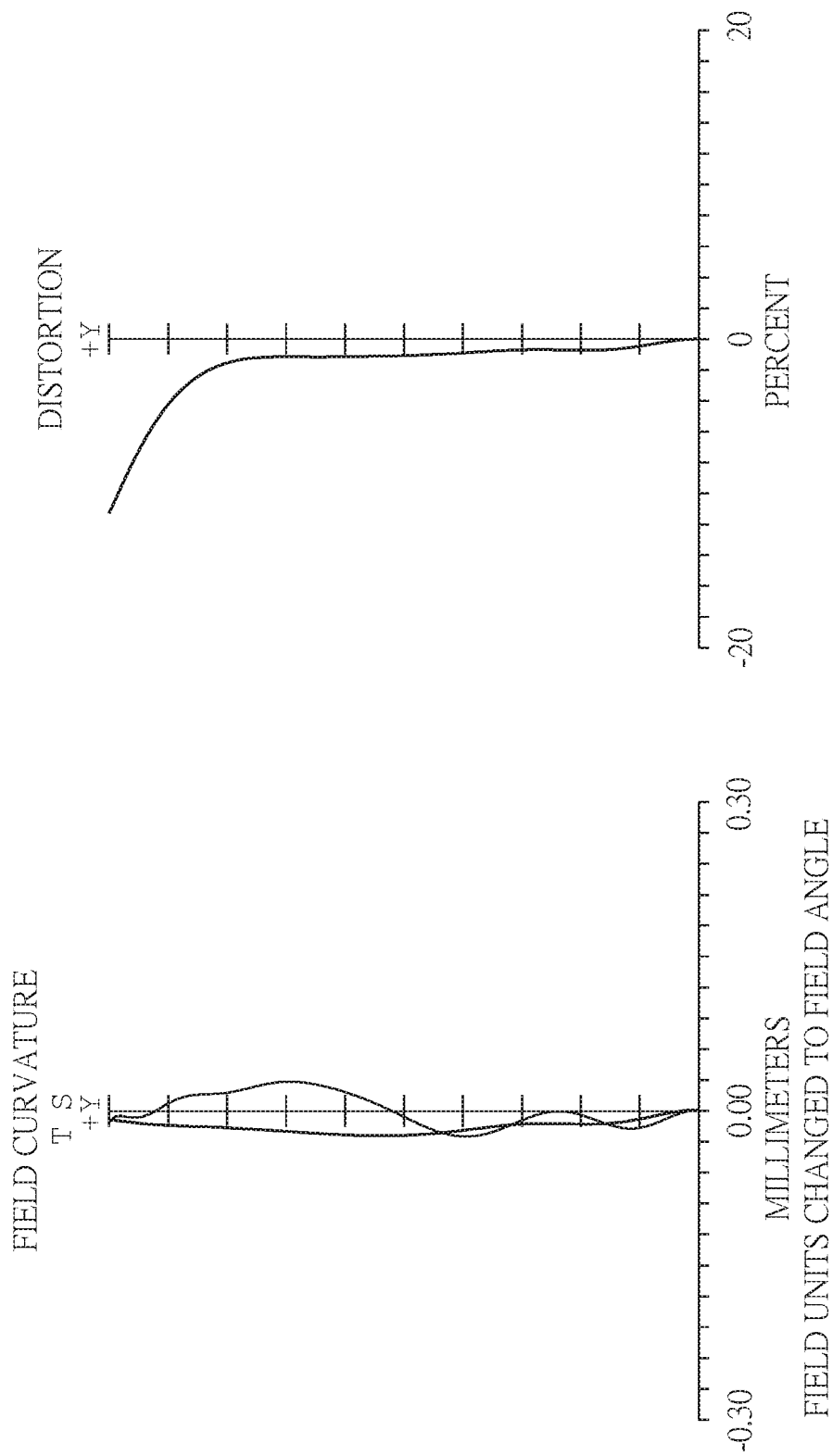
FIG. 1B shows the image plane curve and the distortion curve of the first embodiment of the present invention.

Referring to FIGS. 1A and 1B, FIG. 1A shows a five-piece optical lens system with a wide field of view in accordance with a first embodiment of the present invention, and FIG. 1B shows, in order from left to right, the image plane curve and the distortion curve of the first embodiment of the present invention. A five-piece optical lens system with a wide field of view in accordance with the first embodiment of the present invention comprises a stop 100 and a lens group. The lens group comprises, in order from an object side to an image side: a first lens element 110, a second lens element 120, a third lens element 130, a fourth lens element 140, a fifth lens element 150, an IR cut filter 170, and an image plane 180, wherein the five-piece optical lens system with a wide field of view has a total of five lens elements with refractive power. The stop 100 is disposed between the first lens element 110 and the second lens element 120.

The first lens element 110 with a negative refractive power has an object-side surface 111 being convex near an optical axis 190 and an image-side surface 112 being concave near the optical axis 190, the object-side surface 111 and the image-side surface 112 are aspheric, and the first lens element 110 is made of plastic material.

The second lens element 120 with a positive refractive power has an object-side surface 121 being convex near the optical axis 190 and an image-side surface 122 being convex near the optical axis 190, the object-side surface 121 and the image-side surface 122 are aspheric, and the second lens element 120 is made of plastic material.

The third lens element 130 with a negative refractive power has an object-side surface 131 being convex near the optical axis 190 and an image-side surface 132 being concave near the optical axis 190, the object-side surface 131 and the image-side surface 132 are aspheric, and the third lens element 130 is made of plastic material.

The fourth lens element 140 with a positive refractive power has an object-side surface 141 being concave near the optical axis 190 and an image-side surface 142 being convex near the optical axis 190, the object-side surface 141 and the image-side surface 142 are aspheric, and the fourth lens element 140 is made of plastic material.

The fifth lens element 150 with a negative refractive power has an object-side surface 151 being convex near the optical axis 190 and an image-side surface 152 being concave near the optical axis 190, the object-side surface 151 and the image-side surface 152 are aspheric, the fifth lens element 150 is made of plastic material, and at least one of the object-side surface 151 and the image-side surface 152 is provided with at least one inflection point.

The IR cut filter 170 made of glass is located between the fifth lens element 150 and the image plane 180 and has no influence on the focal length of the five-piece optical lens system with a wide field of view.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Fh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, . . . : represent the high-order aspheric coefficients.

In the first embodiment of the present five-piece optical lens system with a wide field of view, a focal length of the five-piece optical lens system with a wide field of view is f, a f-number of the five-piece optical lens system with a wide field of view is Fno, the five-piece optical lens system with a wide field of view has a maximum view angle (field of view) FOV, and they satisfy the relations: f=1.74 mm; Fno=2.25; and FOV=112.05 degrees.

In the first embodiment of the present five-piece optical lens system with a wide field of view, a central thickness of the first lens element 110 along the optical axis 190 is CT1, a central thickness of the third lens element 130 along the optical axis 190 is CT3, a central thickness of the fourth lens element 140 along the optical axis 190 is CT4, a central thickness of the fifth lens element 150 along the optical axis 190 is CT5, and they satisfy the relations: CT4/(CT1+CT3+CT5)=1.089; (CT1+CT5)/CT3=2.686.

In the first embodiment of the present five-piece optical lens system with a wide field of view, the focal length of the five-piece optical lens system with a wide field of view is f, a focal length of the fourth lens element 140 is f4, and they satisfy the relation: f/f4=1.585.

In the first embodiment of the present five-piece optical lens system with a wide field of view, a focal length of the second lens element 120, the third lens element 130, the fourth lens element 140 and the fifth lens element 150 combined is f2345, the focal length of the five-piece optical lens system with a wide field of view is f, and they satisfy the relation: f/f2345=1.187.

In the first embodiment of the present five-piece optical lens system with a wide field of view, a focal length of the third lens element 130 is f3, the focal length of the fourth lens element 140 is f4, and they satisfy the relation: f3/f4=−6.167.

In the first embodiment of the present five-piece optical lens system with a wide field of view, the focal length of the fourth lens element 140 is f4, a focal length of the fifth lens element 150 is f5, and they satisfy the relation: f5/f4=−1.188.

In the first embodiment of the present five-piece optical lens system with a wide field of view, the central thickness of the fourth lens element 140 along the optical axis 190 is CT4, the central thickness of the third lens element 130 along the optical axis 190 is CT3, and they satisfy the relation: CT4/CT3=4.015.

In the first embodiment of the present five-piece optical lens system with a wide field of view, a central thickness of the second lens element 120 along the optical axis 190 is CT2, the central thickness of the third lens element 130 along the optical axis 190 is CT3, and they satisfy the relation: CT2/CT3=2.507.

In the first embodiment of the present five-piece optical lens system with a wide field of view, the central thickness of the fifth lens element 150 along the optical axis 190 is CT5, the central thickness of the third lens element 130 along the optical axis 190 is CT3, and they satisfy the relation: CT5/CT3=1.607.

In the first embodiment of the present five-piece optical lens system with a wide field of view, the central thickness of the fourth lens element 140 along the optical axis 190 is CT4, the central thickness of the first lens element 110 along the optical axis 190 is CT1, and they satisfy the relation: CT4/CT1=3.720.

In the first embodiment of the present five-piece optical lens system with a wide field of view, the focal length of the second lens element 120, the third lens element 130, the fourth lens element 140 and the fifth lens element 150 combined is f2345, half of an image height that can be captured by the five-piece optical lens system with a wide field of view on the image plane 180 is IMH, and they satisfy the relation: IMH/f2345=1.567.

In the first embodiment of the present five-piece optical lens system with a wide field of view, the focal length of the five-piece optical lens system with a wide field of view is f, half of an image height that can be captured by the five-piece optical lens system with a wide field of view on the image plane 180 is IMH, and they satisfy the relation: IMH/f=1.320.

In the first embodiment of the present five-piece optical lens system with a wide field of view, a distance from the image-side surface 152 of the fifth lens element 150 to the image plane 180 along the optical axis 190 is BFL, the focal length of the five-piece optical lens system with a wide field of view is f, and they satisfy the relation: f/BFL=1.656.

The detailed optical data of the first embodiment is shown in table 1, and the aspheric surface data is shown in table 2.

TABLE 1

Embodiment 1
(focal length) = 1.74 mm, Fno = 2.25, FOV = 112.05 deg.

| surface | | Curvature Radius | | Thickness | Material | Index | Abbe # | Focal length |
|---|---|---|---|---|---|---|---|---|
| 0 | object | infinity | | 350.000 | | | | |
| 1 | test surface | infinity | | 0.000 | | | | |
| 2 | Lens 1 | 11.598 | (ASP) | 0.237 | plastic | 1.55 | 56.0 | −4.66 |
| 3 | | 2.073 | (ASP) | 0.336 | | | | |
| 4 | stop | infinity | | −0.002 | | | | |
| 5 | Lens 2 | 4.014 | (ASP) | 0.552 | plastic | 1.55 | 56.0 | 1.92 |

TABLE 1-continued

Embodiment 1
(focal length) = 1.74 mm, Fno = 2.25, FOV = 112.05 deg.

| surface | | Curvature Radius | | Thickness | Material | Index | Abbe # | Focal length |
|---|---|---|---|---|---|---|---|---|
| 6 | | −1.349 | (ASP) | 0.076 | | | | |
| 7 | Lens 3 | 3.609 | (ASP) | 0.220 | plastic | 1.68 | 19.2 | −6.78 |
| 8 | | 1.972 | (ASP) | 0.230 | | | | |
| 9 | Lens 4 | −3.492 | (ASP) | 0.883 | plastic | 1.55 | 56.0 | 1.10 |
| 10 | | −0.558 | (ASP) | 0.053 | | | | |
| 11 | Lens 5 | 1.600 | (ASP) | 0.354 | plastic | 1.67 | 20.4 | −1.31 |
| 12 | | 0.514 | (ASP) | 0.442 | | | | |
| 13 | IR-filter | infinity | | 0.210 | glass | 1.52 | 64.2 | |
| 14 | | infinity | | 0.400 | | | | |
| 15 | Image plane | infinity | | 0.000 | | | | |

TABLE 2

Aspheric Coefficients

| surface | 2 | 3 | 5 | 6 | 7 |
|---|---|---|---|---|---|
| K: | 1.7615E+02 | −1.3448E+02 | −5.7655E+00 | −9.1361E−01 | −1.9290E+02 |
| A: | 0.0000E+00 | 0.0000E+00 | 0.0000E+00 | 0.0000E+00 | 0.0000E+00 |
| B: | 7.4483E−01 | 2.8208E+00 | −1.4829E−01 | −1.0231E+00 | −7.2289E−01 |
| C: | −1.6376E+00 | −1.6540E+01 | 3.2651E+00 | 4.3097E+00 | 1.9116E+00 |
| D: | 5.7382E+00 | 1.2618E+02 | −5.0793E+01 | −2.5922E+01 | −7.6152E+00 |
| E: | −1.5735E+01 | −6.7318E+02 | 2.8725E+02 | 1.2529E+02 | 3.7386E+01 |
| F: | 2.7974E+01 | 2.3147E+03 | −3.6644E+02 | −4.6309E+02 | −1.3145E+02 |
| G: | −2.7447E+01 | −4.3308E+03 | −2.9737E+03 | 9.6447E+02 | 2.3361E+02 |
| H: | 1.0660E+01 | 3.2369E+03 | 8.6823E+03 | −8.4636E+02 | −1.5772E+02 |

| surface | 8 | 9 | 10 | 11 | 12 |
|---|---|---|---|---|---|
| K: | −4.5562E+00 | −1.3716E+01 | −1.4573E+00 | −1.9562E+01 | −4.7758E+00 |
| A: | 0.0000E+00 | 0.0000E+00 | 0.0000E+00 | 0.0000E+00 | 0.0000E+00 |
| B: | −4.3600E−01 | 9.8398E−03 | 8.8900E−01 | 1.0059E−02 | −1.0771E−01 |
| C: | 9.2460E−01 | 6.7216E−01 | −3.3812E+00 | −3.9833E−01 | −3.5666E−02 |
| D: | −1.3565E+00 | −4.5510E+00 | 7.7680E+00 | 4.8352E−01 | 8.4273E−02 |
| E: | 3.3784E+00 | 1.4169E+01 | −1.1521E+01 | −3.4893E−01 | −5.9680E−02 |
| F: | −9.7651E+00 | −2.2631E+01 | 1.0327E+01 | 1.4503E−01 | 2.1938E−02 |
| G: | 1.4394E+01 | 1.8172E+01 | −4.9237E+00 | −2.8990E−02 | −4.2316E−03 |
| H: | −7.5671E+00 | −5.8132E+00 | 9.5405E−01 | 2.0074E−03 | 3.3708E−04 |

The units of the radius of curvature, the thickness and the focal length in table 1 are expressed in mm, the surface numbers 0-15 represent the surfaces sequentially arranged from the object-side to the image-side along the optical axis, and the test surface (i.e. surface 1). In table 2, k represents the conic coefficient of the equation of the aspheric surface profiles, and A, B, C, D, E, F . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
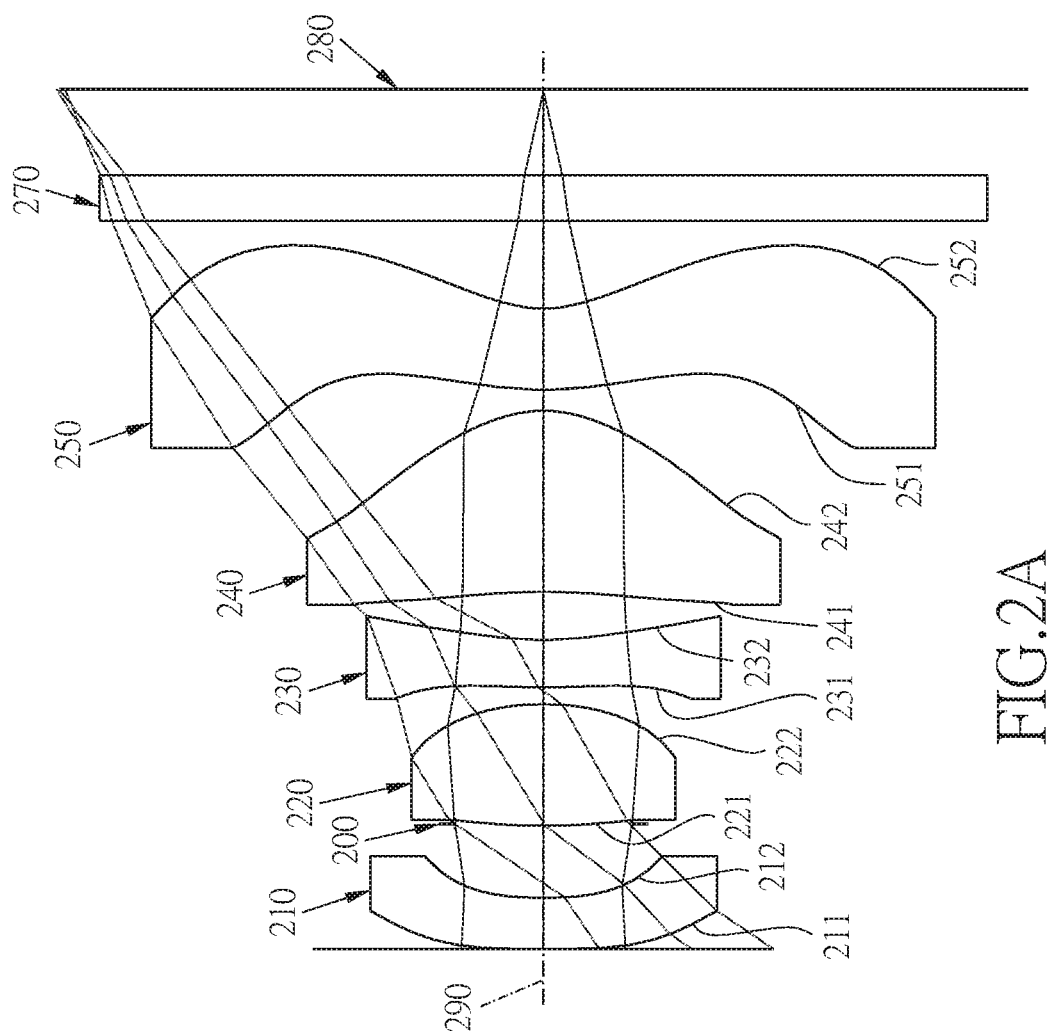
FIG. 2A shows a five-piece optical lens system with a wide field of view in accordance with a second embodiment of the present invention.
Figure 2B:
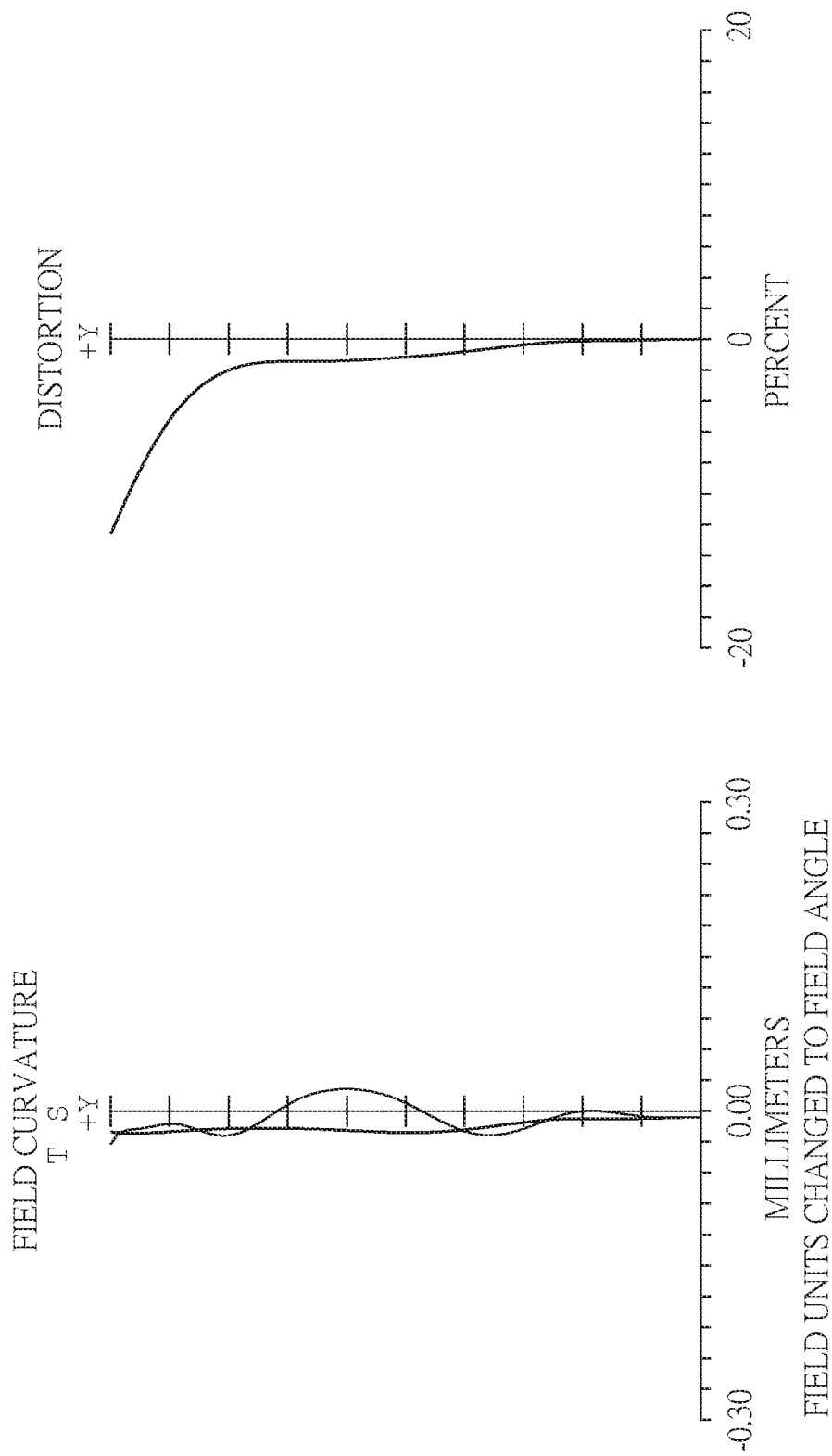
FIG. 2B shows the image plane curve and the distortion curve of the second embodiment of the present invention.

Referring to FIGS. 2A and 2B, FIG. 2A shows a five-piece optical lens system with a wide field of view in accordance with a second embodiment of the present invention, and FIG. 2B shows, in order from left to right, the image plane curve and the distortion curve of the second embodiment of the present invention. A five-piece optical lens system with a wide field of view in accordance with the second embodiment of the present invention comprises a stop 200 and a lens group. The lens group comprises, in order from an object side to an image side: a first lens element 210, a second lens element 220, a third lens element 230, a fourth lens element 240, a fifth lens element 250, an IR cut filter 270, and an image plane 280, wherein the five-piece optical lens system with a wide field of view has a total of five lens elements with refractive power. The stop 200 is disposed between the first lens element 210 and the second lens element 220.

The first lens element 210 with a negative refractive power has an object-side surface 211 being convex near an optical axis 290 and an image-side surface 212 being concave near the optical axis 290, the object-side surface 211 and the image-side surface 212 are aspheric, and the first lens element 210 is made of plastic material.

The second lens element 220 with a positive refractive power has an object-side surface 221 being convex near the optical axis 290 and an image-side surface 222 being convex near the optical axis 290, the object-side surface 221 and the image-side surface 222 are aspheric, and the second lens element 220 is made of plastic material.

The third lens element 230 with a negative refractive power has an object-side surface 231 being convex near the optical axis 290 and an image-side surface 232 being concave near the optical axis 290, the object-side surface 231 and the image-side surface 232 are aspheric, and the third lens element 230 is made of plastic material.

The fourth lens element 240 with a positive refractive power has an object-side surface 241 being concave near the optical axis 290 and an image-side surface 242 being convex near the optical axis 290, the object-side surface 241 and the image-side surface 242 are aspheric, and the fourth lens element 240 is made of plastic material.

The fifth lens element 250 with a negative refractive power has an object-side surface 251 being convex near the optical axis 290 and an image-side surface 252 being concave near the optical axis 290, the object-side surface 251 and the image-side surface 252 are aspheric, the fifth lens element 250 is made of plastic material, and at least one of the object-side surface 251 and the image-side surface 252 is provided with at least one inflection point.

The IR cut filter 270 made of glass is located between the fifth lens element 250 and the image plane 280 and has no influence on the focal length of the five-piece optical lens system with a wide field of view.

The detailed optical data of the second embodiment is shown in table 3, and the aspheric surface data is shown in table 4.

TABLE 3

Embodiment 2
f(focal length) = 1.73 mm, Fno = 2.24, FOV = 112.99 deg.

| surface | | Curvature Radius | | Thickness | Material | Index | Abbe # | Focal length |
|---|---|---|---|---|---|---|---|---|
| 0 | object | infinity | | 350.000 | | | | |
| 1 | test surface | infinity | | 0.000 | | | | |
| 2 | Lens 1 | 22.342 | (ASP) | 0.237 | plastic | 1.55 | 56.0 | −4.02 |
| 3 | | 1.993 | (ASP) | 0.343 | | | | |
| 4 | stop | infinity | | −0.010 | | | | |
| 5 | Lens 2 | 3.011 | (ASP) | 0.566 | plastic | 1.55 | 56.0 | 1.80 |
| 6 | | −1.365 | (ASP) | 0.078 | | | | |
| 7 | Lens 3 | 2.943 | (ASP) | 0.220 | plastic | 1.68 | 19.2 | −6.56 |
| 8 | | 1.717 | (ASP) | 0.223 | | | | |
| 9 | Lens 4 | −2.920 | (ASP) | 0.840 | plastic | 1.55 | 56.0 | 1.22 |
| 10 | | −0.596 | (ASP) | 0.098 | | | | |
| 11 | Lens 5 | 1.779 | (ASP) | 0.377 | plastic | 1.67 | 20.4 | −1.50 |
| 12 | | 0.585 | (ASP) | 0.407 | | | | |
| 13 | IR-filter | infinity | | 0.210 | glass | 1.52 | 64.2 | |
| 14 | | infinity | | 0.400 | | | | |
| 15 | Image plane | infinity | | 0.000 | | | | |

TABLE 4

Aspheric Coefficients

| surface | 2 | 3 | 5 | 6 | 7 |
|---|---|---|---|---|---|
| K: | 5.0201E+02 | −1.2175E+02 | 4.6294E+00 | −1.5842E+00 | −1.2443E+02 |
| A: | 0.0000E+00 | 0.0000E+00 | 0.0000E+00 | 0.0000E+00 | 0.0000E+00 |
| B: | 7.5057E−01 | 2.8270E+00 | −2.2628E−01 | −9.5798E−01 | −7.0245E−01 |
| C: | −1.7216E+00 | −1.6474E+01 | 1.0243E+01 | 3.6557E+00 | 1.8130E+00 |
| D: | 5.7641E+00 | 1.2455E+02 | −2.3480E+02 | −1.7247E+01 | −6.4606E+00 |
| E: | −1.5137E+01 | −6.6012E+02 | 2.7677E+03 | 7.1633E+01 | 2.9851E+01 |
| F: | 2.5203E+01 | 2.2628E+03 | −1.8070E+04 | −2.7430E+02 | −1.0926E+02 |
| G: | −2.3568E+01 | −4.3241E+03 | 6.1135E+04 | 6.1412E+02 | 2.0417E+02 |
| H: | 9.1158E+00 | 3.4306E+03 | −8.3928E+04 | −5.7833E+02 | −1.4649E+02 |

| surface | 8 | 9 | 10 | 11 | 12 |
|---|---|---|---|---|---|
| K: | −4.3441E+00 | −3.4577E+01 | −1.4821E+00 | −1.9148E+01 | −5.0110E+00 |
| A: | 0.0000E+00 | 0.0000E+00 | 0.0000E+00 | 0.0000E+00 | 0.0000E+00 |
| B: | −4.4188E−01 | 9.0893E−02 | 7.5080E−01 | 2.7971E−02 | −8.8939E−02 |
| C: | 9.9412E−01 | 7.6737E−02 | −2.8747E+00 | −4.0004E−01 | −5.6317E−02 |
| D: | −1.6516E+00 | −1.2622E+00 | 7.1166E+00 | 4.9280E−01 | 1.0021E−01 |
| E: | 3.6518E+00 | 4.9606E+00 | −1.1391E+01 | −3.7407E−01 | −6.7815E−02 |
| F: | −8.9693E+00 | −8.9619E+00 | 1.1040E+01 | 1.6260E−01 | 2.4314E−02 |
| G: | 1.2300E+01 | 7.8376E+00 | −5.6894E+00 | −3.4520E−02 | −4.5946E−03 |
| H: | −6.3092E+00 | −2.8028E+00 | 1.1819E+00 | 2.7263E−03 | 3.5916E−04 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 1.73 | f5/f4 | −1.229 |
| Fno | 2.24 | CT4/CT3 | 3.817 |
| FOV[deg.] | 112.99 | CT2/CT3 | 2.572 |
| CT4/(CT1 + CT3 + CT5) | 1.006 | CT5/CT3 | 1.714 |
| (CT1 + CT5)/CT3 | 2.793 | CT4/CT1 | 3.536 |
| f/f4 | 1.424 | IMH/f2345 | 1.617 |
| f/f2345 | 1.218 | IMH/f | 1.328 |
| f3/f4 | −5.388 | f/BFL | 1.703 |

Figure 3A:
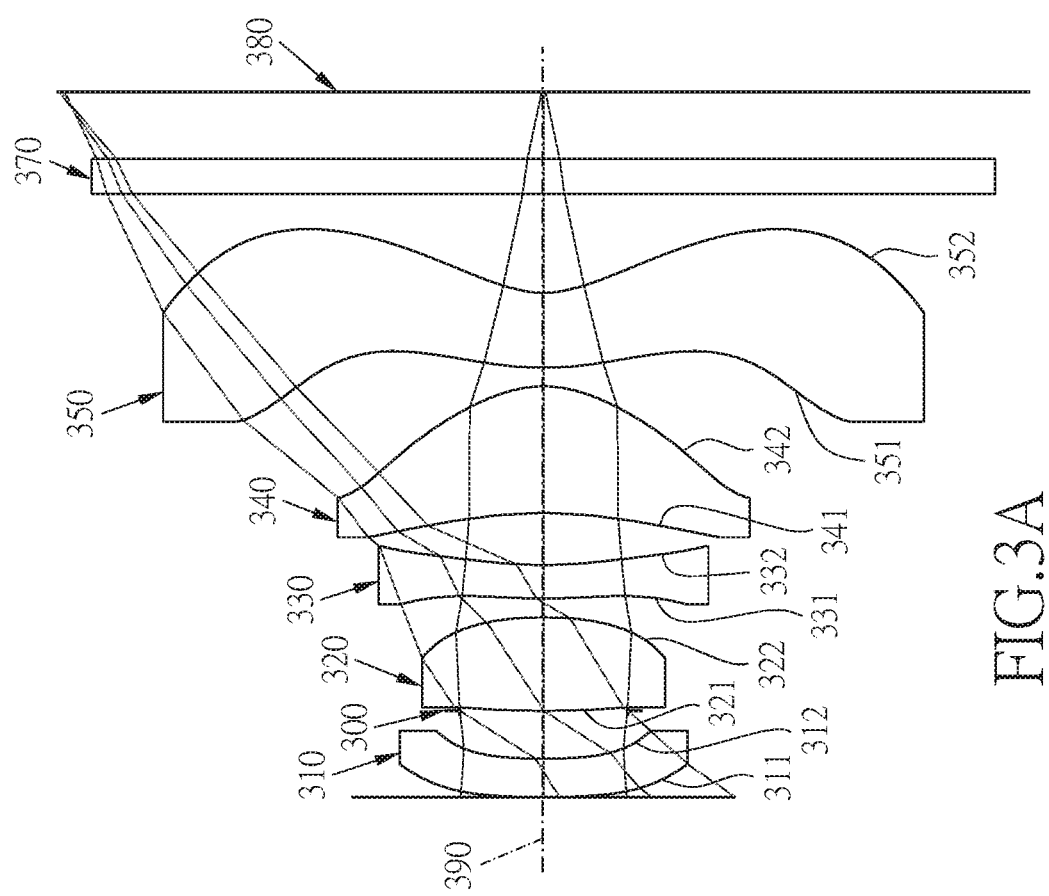
FIG. 3A shows a five-piece optical lens system with a wide field of view in accordance with a third embodiment of the present invention.

Referring to FIGS. 3A and 3B, FIG. 3A shows a five-piece optical lens system with a wide field of view in accordance with a third embodiment of the present invention, and FIG. 3B shows, in order from left to right, the image plane curve and the distortion curve of the third embodiment of the present invention. A five-piece optical lens system with a wide field of view in accordance with the third embodiment of the present invention comprises a stop 300 and a lens group. The lens group comprises, in order from an object side to an image side: a first lens element 310, a second lens element 320, a third lens element 330, a fourth lens element 340, a fifth lens element 350, an IR cut filter 370, and an image plane 380, wherein the five-piece optical lens system with a wide field of view has a total of five lens elements with refractive power. The stop 300 is disposed between the first lens element 310 and the second lens element 320.

The first lens element 310 with a negative refractive power has an object-side surface 311 being convex near an optical axis 390 and an image-side surface 312 being concave near the optical axis 390, the object-side surface 311 and the image-side surface 312 are aspheric, and the first lens element 310 is made of plastic material.

The second lens element 320 with a positive refractive power has an object-side surface 321 being convex near the optical axis 390 and an image-side surface 322 being convex near the optical axis 390, the object-side surface 321 and the image-side surface 322 are aspheric, and the second lens element 320 is made of plastic material.

The third lens element 330 with a negative refractive power has an object-side surface 331 being convex near the optical axis 390 and an image-side surface 332 being concave near the optical axis 390, the object-side surface 331 and the image-side surface 332 are aspheric, and the third lens element 330 is made of plastic material.

The fourth lens element 340 with a positive refractive power has an object-side surface 341 being concave near the optical axis 390 and an image-side surface 342 being convex near the optical axis 390, the object-side surface 341 and the image-side surface 342 are aspheric, and the fourth lens element 340 is made of plastic material.

The fifth lens element 350 with a negative refractive power has an object-side surface 351 being convex near the optical axis 390 and an image-side surface 352 being concave near the optical axis 390, the object-side surface 351 and the image-side surface 352 are aspheric, the fifth lens element 350 is made of plastic material, and at least one of the object-side surface 351 and the image-side surface 352 is provided with at least one inflection point.

The IR cut filter 370 made of glass is located between the fifth lens element 350 and the image plane 380 and has no influence on the focal length of the five-piece optical lens system with a wide field of view.

The detailed optical data of the third embodiment is shown in table 5, and the aspheric surface data is shown in table 6.

TABLE 5

Embodiment 3
f(focal length) = 2.22 mm, Fno = 2.20, FOV = 112.14 deg.

| surface | | Curvature Radius | | Thickness | Material | Index | Abbe # | Focal length |
|---|---|---|---|---|---|---|---|---|
| 0 | object | infinity | | 350.000 | | | | |
| 1 | test surface | infinity | | 0.000 | | | | |
| 2 | Lens 1 | 13.584 | (ASP) | 0.230 | plastic | 1.55 | 56.0 | −8.31 |
| 3 | | 3.382 | (ASP) | 0.286 | | | | |
| 4 | stop | infinity | | −0.002 | | | | |
| 5 | Lens 2 | 4.884 | (ASP) | 0.561 | plastic | 1.55 | 56.0 | 2.93 |
| 6 | | −2.287 | (ASP) | 0.111 | | | | |
| 7 | Lens 3 | 2.849 | (ASP) | 0.200 | plastic | 1.68 | 19.2 | −36.19 |
| 8 | | 2.480 | (ASP) | 0.314 | | | | |
| 9 | Lens 4 | −2.786 | (ASP) | 0.758 | plastic | 1.55 | 56.0 | 1.50 |
| 10 | | −0.695 | (ASP) | 0.110 | | | | |
| 11 | Lens 5 | 1.917 | (ASP) | 0.448 | plastic | 1.67 | 20.4 | −1.63 |
| 12 | | 0.630 | (ASP) | 0.591 | | | | |
| 13 | IR-filter | infinity | | 0.210 | glass | 1.52 | 64.2 | |
| 14 | | infinity | | 0.400 | | | | |
| 15 | Image plane | infinity | | 0.000 | | | | |

TABLE 6

Aspheric Coefficients

| surface | 2 | 3 | 5 | 6 | 7 |
|---|---|---|---|---|---|
| K: | 1.8425E+02 | −5.8954E+02 | −9.9720E+00 | −1.7664E−01 | −9.6517E+01 |
| A: | 0.0000E+00 | 0.0000E+00 | 0.0000E+00 | 0.0000E+00 | 0.0000E+00 |
| B: | 7.0268E−01 | 1.0462E+00 | −5.0236E−01 | −1.6643E−01 | −2.9118E−01 |
| C: | −3.3827E+00 | −7.6594E−01 | 1.1876E+00 | −1.8894E+00 | 8.4994E−01 |
| D: | 1.3691E+01 | −1.4557E+01 | −1.5153E+02 | 1.0018E+01 | −4.5497E+00 |
| E: | −3.1933E+01 | 1.2074E+02 | 1.0968E+03 | −2.8692E+01 | 1.4195E+01 |
| F: | 4.2820E+01 | −4.0018E+02 | −4.5401E+03 | 4.3262E+01 | −2.4181E+01 |
| G: | −3.0683E+01 | 6.3726E+02 | 9.9777E+03 | −2.9696E+01 | 2.1495E+01 |
| H: | 9.0317E+00 | −3.9715E+02 | −9.0418E+03 | 2.7177E+00 | −7.8448E+00 |

| surface | 8 | 9 | 10 | 11 | 12 |
|---|---|---|---|---|---|
| K: | −4.3879E+00 | −7.4465E+00 | −1.4826E+00 | −1.6994E+01 | −4.5454E+00 |
| A: | 0.0000E+00 | 0.0000E+00 | 0.0000E+00 | 0.0000E+00 | 0.0000E+00 |
| B: | −2.2649E−01 | −1.8691E−02 | 5.0600E−01 | 3.4562E−02 | −8.7314E−02 |
| C: | 3.5933E−01 | 4.8485E−01 | −1.3869E+00 | −2.2558E−01 | 2.7255E−02 |
| D: | −9.0599E−01 | −1.7503E+00 | 2.5960E+00 | 2.2817E−01 | −6.1076E−03 |
| E: | 2.6272E+00 | 2.8025E+00 | −3.3448E+00 | −1.3922E−01 | 3.1171E−04 |
| F: | −4.3155E+00 | −2.1442E+00 | 2.5524E+00 | 4.8908E−02 | 1.2554E−04 |
| G: | 3.4808E+00 | 7.0869E−01 | −9.9652E−01 | −8.8151E−03 | −2.4930E−05 |
| H: | −1.0831E+00 | −6.1737E−02 | 1.5325E−01 | 6.3295E−04 | 1.4448E−06 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 2.22 | f5/f4 | −1.087 |
| Fno | 2.20 | CT4/CT3 | 3.790 |
| FOV[deg.] | 112.14 | CT2/CT3 | 2.804 |
| CT4/(CT1 + CT3 + CT5) | 0.864 | CT5/CT3 | 2.238 |
| (CT1 + CT5)/CT3 | 3.386 | CT4/CT1 | 3.302 |
| f/f4 | 1.478 | IMH/f2345 | 1.594 |
| f/f2345 | 1.202 | IMH/f | 1.326 |
| f3/f4 | −24.097 | f/BFL | 1.849 |

Figure 4A:
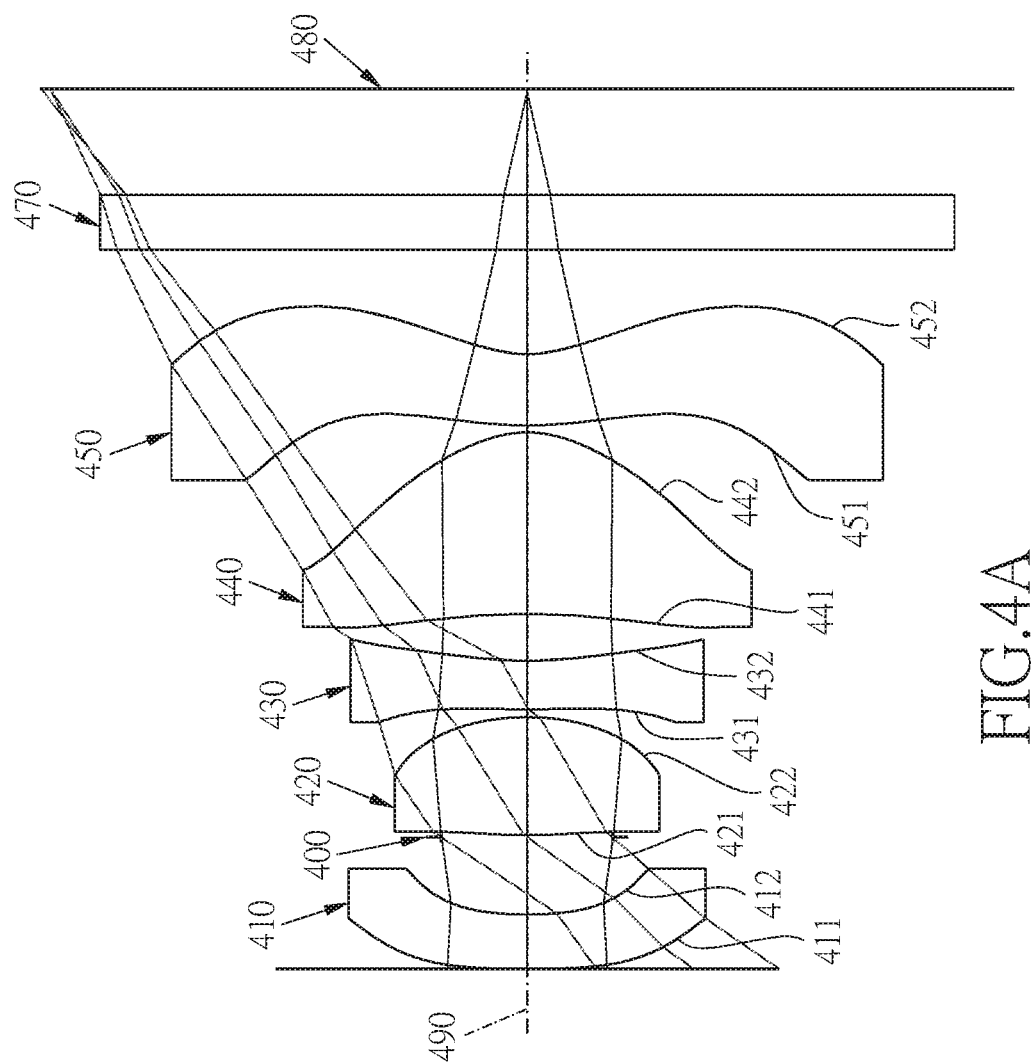
FIG. 4A shows a five-piece optical lens system with a wide field of view in accordance with a fourth embodiment of the present invention.
Figure 4B:
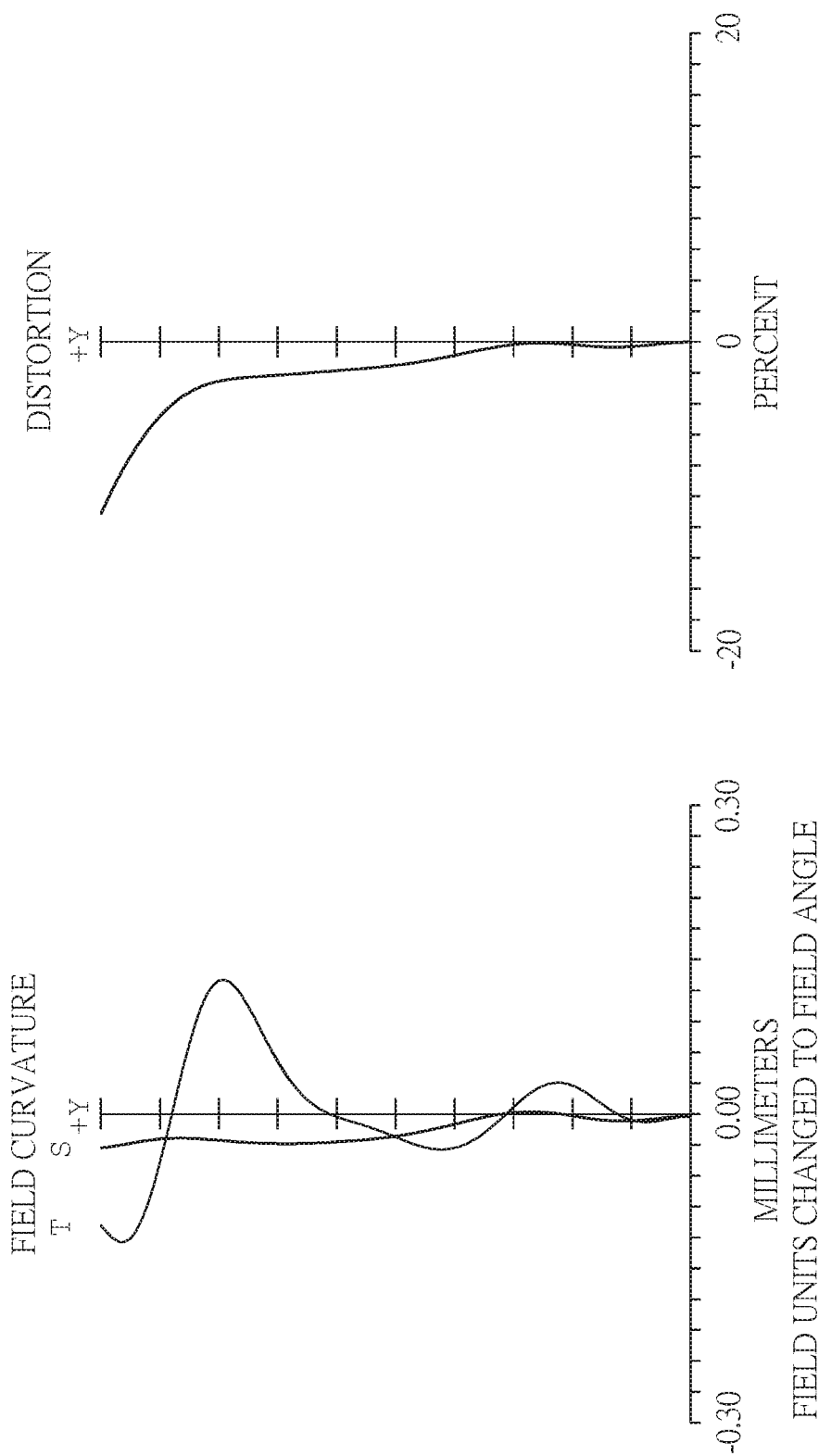
FIG. 4B shows the image plane curve and the distortion curve of the fourth embodiment of the present invention.

Referring to FIGS. 4A and 4B, FIG. 4A shows a five-piece optical lens system with a wide field of view in accordance with a fourth embodiment of the present invention, and FIG. 4B shows, in order from left to right, the image plane curve and the distortion curve of the fourth embodiment of the present invention. A five-piece optical lens system with a wide field of view in accordance with the fourth embodiment of the present invention comprises a stop 400 and a lens group. The lens group comprises, in order from an object side to an image side: a first lens element 410, a second lens element 420, a third lens element 430, a fourth lens element 440, a fifth lens element 450, an IR cut filter 470, and an image plane 480, wherein the five-piece optical lens system with a wide field of view has a total of five lens elements with refractive power. The stop 400 is disposed between the first lens element 410 and the second lens element 420.

The first lens element 410 with a negative refractive power has an object-side surface 411 being convex near an optical axis 490 and an image-side surface 412 being concave near the optical axis 490, the object-side surface 411 and the image-side surface 412 are aspheric, and the first lens element 410 is made of plastic material.

The second lens element 420 with a positive refractive power has an object-side surface 421 being convex near the optical axis 490 and an image-side surface 422 being convex near the optical axis 490, the object-side surface 421 and the image-side surface 422 are aspheric, and the second lens element 420 is made of plastic material.

The third lens element 430 with a negative refractive power has an object-side surface 431 being convex near the optical axis 490 and an image-side surface 432 being concave near the optical axis 490, the object-side surface 431 and the image-side surface 432 are aspheric, and the third lens element 430 is made of plastic material.

The fourth lens element 440 with a positive refractive power has an object-side surface 441 being concave near the optical axis 490 and an image-side surface 442 being convex near the optical axis 490, the object-side surface 441 and the image-side surface 442 are aspheric, and the fourth lens element 440 is made of plastic material.

The fifth lens element 450 with a negative refractive power has an object-side surface 451 being convex near the optical axis 490 and an image-side surface 452 being concave near the optical axis 490, the object-side surface 451 and the image-side surface 452 are aspheric, the fifth lens element 450 is made of plastic material, and at least one of the object-side surface 451 and the image-side surface 452 is provided with at least one inflection point.

The IR cut filter 470 made of glass is located between the fifth lens element 450 and the image plane 480 and has no influence on the focal length of the five-piece optical lens system with a wide field of view.

The detailed optical data of the fourth embodiment is shown in table 7, and the aspheric surface data is shown in table 8.

TABLE 7

Embodiment 4
f(focal length) = 1.39 mm, Fno = 2.26, FOV = 112.15 deg.

| surface | | Curvature Radius | | Thickness | Material | Index | Abbe # | Focal length |
|---|---|---|---|---|---|---|---|---|
| 0 | object | infinity | | 354.821 | | | | |
| 1 | test surface | infinity | | 0.000 | | | | |
| 2 | Lens 1 | 9.405 | (ASP) | 0.205 | plastic | 1.55 | 56.0 | -3.70 |
| 3 | | 1.650 | (ASP) | 0.293 | | | | |
| 4 | stop | infinity | | 0.009 | | | | |
| 5 | Lens 2 | 3.491 | (ASP) | 0.446 | plastic | 1.55 | 56.0 | 1.54 |
| 6 | | -1.062 | (ASP) | 0.030 | | | | |
| 7 | Lens 3 | 3.611 | (ASP) | 0.182 | plastic | 1.68 | 19.2 | -4.16 |
| 8 | | 1.550 | (ASP) | 0.179 | | | | |
| 9 | Lens 4 | -2.624 | (ASP) | 0.689 | plastic | 1.55 | 56.0 | 0.85 |
| 10 | | -0.431 | (ASP) | 0.025 | | | | |
| 11 | Lens 5 | 1.529 | (ASP) | 0.270 | plastic | 1.67 | 20.4 | -1.15 |
| 12 | | 0.475 | (ASP) | 0.395 | | | | |
| 13 | IR-filter | infinity | | 0.210 | glass | 1.52 | 64.2 | |
| 14 | | infinity | | 0.400 | | | | |
| 15 | Image plane | infinity | | 0.000 | | | | |

TABLE 8

Aspheric Coefficients

| surface | 2 | 3 | 5 | 6 | 7 |
|---|---|---|---|---|---|
| K: | 1.7998E+02 | -1.1453E+02 | -6.7255E+00 | -1.5949E+00 | -2.2118E+02 |
| A: | 0.0000E+00 | 0.0000E+00 | 0.0000E+00 | 0.0000E+00 | 0.0000E+00 |
| B: | 1.1512E+00 | 5.9344E+00 | -2.2216E-01 | -2.2041E+00 | -1.2016E+00 |
| C: | -1.0417E+00 | -6.9187E+01 | 1.0322E+01 | 2.0295E+01 | -3.3401E-01 |
| D: | -3.8405E+00 | 9.6232E+02 | -4.0615E+02 | -2.1500E+02 | 5.2483E+01 |
| E: | 2.1873E+01 | -8.8760E+03 | 7.4469E+03 | 1.6244E+03 | -4.0065E+02 |
| F: | -3.6171E+01 | 4.9481E+04 | -7.4649E+04 | -8.1896E+03 | 1.3538E+03 |
| G: | 1.6652E+01 | -1.4658E+05 | 3.7994E+05 | 2.2845E+04 | -2.1460E+03 |
| H: | -3.2301E+00 | 1.7507E+05 | -7.8163E+05 | -2.6973E+04 | 1.2689E+03 |

| surface | 8 | 9 | 10 | 11 | 12 |
|---|---|---|---|---|---|
| K: | -5.1523E+00 | -1.6164E+01 | -1.4375E+00 | -2.8232E+01 | -6.3295E+00 |
| A: | 0.0000E+00 | 0.0000E+00 | 0.0000E+00 | 0.0000E+00 | 0.0000E+00 |
| B: | -8.0439E-01 | 5.8185E-02 | 2.0679E+00 | -2.0269E-02 | -1.8394E-01 |
| C: | 2.7802E+00 | 1.0605E+00 | -1.3878E+01 | -7.7618E-01 | -2.8015E-01 |
| D: | -7.3226E+00 | -1.2687E+01 | 5.4742E+01 | 1.7356E-01 | 6.5264E-01 |
| E: | 2.1624E+01 | 6.2253E+01 | -1.3678E+02 | 2.1142E-01 | -6.0231E-01 |
| F: | -6.6319E+01 | -1.4724E+02 | 2.0447E+02 | -3.5536E+00 | 2.9337E-01 |
| G: | 1.2670E+02 | 1.6919E+02 | -1.6265E+02 | 2.3306E+00 | -7.6167E-02 |
| H: | -9.3330E+01 | -7.5517E+01 | 5.2724E+01 | -5.4969E-01 | 8.4689E-03 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

Embodiment 4

| | | | |
|---|---|---|---|
| f[mm] | 1.39 | f5/f4 | -1.356 |
| Fno | 2.26 | CT4/CT3 | 3.773 |
| FOV[deg.] | 112.15 | CT2/CT3 | 2.443 |
| CT4/(CT1 + CT3 + CT5) | 1.046 | CT5/CT3 | 1.481 |
| (CT1 + CT5)/CT3 | 2.607 | CT4/CT1 | 3.352 |
| f/f4 | 1.636 | IMH/f2345 | 1.512 |

-continued

Embodiment 4

| | | | |
|---|---|---|---|
| f/f2345 | 1.141 | IMH/f | 1.325 |
| f3/f4 | -4.896 | f/BFL | 1.382 |

Figure 5A:
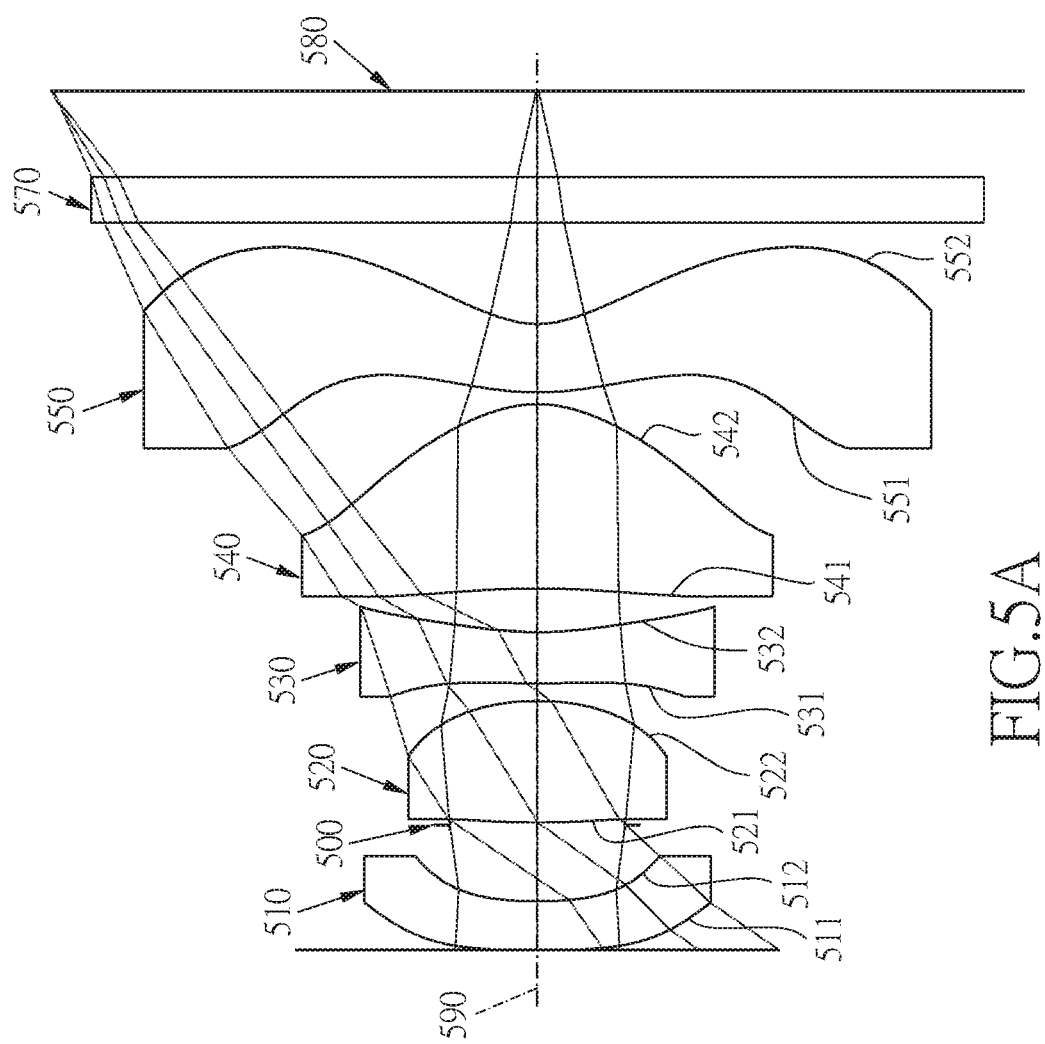
FIG. 5A shows a five-piece optical lens system with a wide field of view in accordance with a fifth embodiment of the present invention.
Figure 5B:
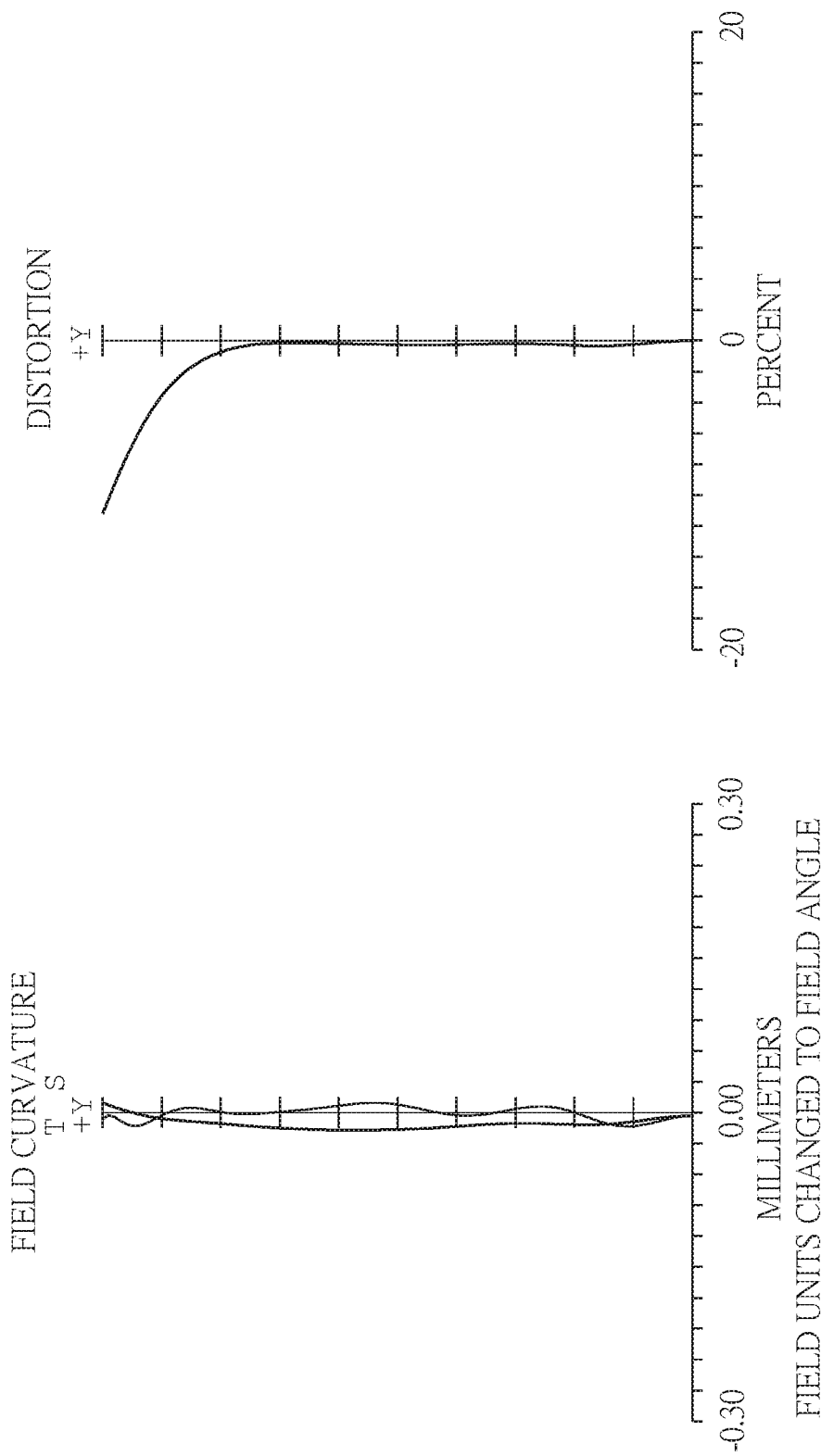
FIG. 5B shows the image plane curve and the distortion curve of the fifth embodiment of the present invention.

Referring to FIGS. 5A and 5B, FIG. 5A shows a five-piece optical lens system with a wide field of view in accordance with a fifth embodiment of the present invention, and FIG. 5B shows, in order from left to right, the image plane curve and the distortion curve of the fifth embodiment of the present invention. A five-piece optical lens system with a wide field of view in accordance with the fifth embodiment of the present invention comprises a stop 500 and a lens group. The lens group comprises, in order from an object side to an image side: a first lens element 510, a second lens element 520, a third lens element 530, a fourth lens element 540, a fifth lens element 550, an IR cut filter 570, and an image plane 580, wherein the five-piece optical lens system with a wide field of view has a total of five lens elements with refractive power. The stop 500 is disposed between the first lens element 510 and the second lens element 520.

The first lens element 510 with a negative refractive power has an object-side surface 511 being convex near an optical axis 590 and an image-side surface 512 being concave near the optical axis 590, the object-side surface 511 and the image-side surface 512 are aspheric, and the first lens element 510 is made of plastic material.

The second lens element 520 with a positive refractive power has an object-side surface 521 being convex near the optical axis 590 and an image-side surface 522 being convex near the optical axis 590, the object-side surface 521 and the image-side surface 522 are aspheric, and the second lens element 520 is made of plastic material.

The third lens element 530 with a negative refractive power has an object-side surface 531 being convex near the optical axis 590 and an image-side surface 532 being concave near the optical axis 590, the object-side surface 531 and the image-side surface 532 are aspheric, and the third lens element 530 is made of plastic material.

The fourth lens element 540 with a positive refractive power has an object-side surface 541 being concave near the optical axis 590 and an image-side surface 542 being convex near the optical axis 590, the object-side surface 541 and the image-side surface 542 are aspheric, and the fourth lens element 540 is made of plastic material.

The fifth lens element 550 with a negative refractive power has an object-side surface 551 being convex near the optical axis 590 and an image-side surface 552 being concave near the optical axis 590, the object-side surface 551 and the image-side surface 552 are aspheric, the fifth lens element 550 is made of plastic material, and at least one of the object-side surface 551 and the image-side surface 552 is provided with at least one inflection point.

The IR cut filter 570 made of glass is located between the fifth lens element 550 and the image plane 580 and has no influence on the focal length of the five-piece optical lens system with a wide field of view.

The detailed optical data of the fifth embodiment is shown in table 9, and the aspheric surface data is shown in table 10.

TABLE 9

Embodiment 5
f(focal length) = 1.74 mm, Fno = 2.25, FOV = 111.87 deg.

| surface | | Curvature Radius | | Thickness | Material | Index | Abbe # | Focal length |
|---|---|---|---|---|---|---|---|---|
| 0 | object | infinity | | 350.000 | | | | |
| 1 | test surface | infinity | | 0.000 | | | | |
| 2 | Lens 1 | 11.426 | (ASP) | 0.227 | plastic | 1.55 | 56.0 | −4.72 |
| 3 | | 2.088 | (ASP) | 0.356 | | | | |
| 4 | stop | infinity | | 0.010 | | | | |
| 5 | Lens 2 | 3.827 | (ASP) | 0.565 | plastic | 1.55 | 56.0 | 1.84 |
| 6 | | −1.294 | (ASP) | 0.082 | | | | |
| 7 | Lens 3 | 3.646 | (ASP) | 0.238 | plastic | 1.68 | 19.2 | −4.87 |
| 8 | | 1.686 | (ASP) | 0.201 | | | | |
| 9 | Lens 4 | −4.642 | (ASP) | 0.858 | plastic | 1.55 | 56.0 | 1.14 |
| 10 | | −0.586 | (ASP) | 0.054 | | | | |
| 11 | Lens 5 | 1.369 | (ASP) | 0.317 | plastic | 1.55 | 56.0 | −1.47 |
| 12 | | 0.465 | (ASP) | 0.473 | | | | |
| 13 | IR-filter | infinity | | 0.210 | glass | 1.52 | 64.2 | |
| 14 | | infinity | | 0.400 | | | | |
| 15 | Image plane | infinity | | 0.000 | | | | |

TABLE 10

Aspheric Coefficients

| surface | 2 | 3 | 5 | 6 | 7 |
|---|---|---|---|---|---|
| K: | 1.7584E+02 | −1.3804E+02 | −8.3732E+00 | −9.5997E−01 | −2.5377E+02 |
| A: | 0.0000E+00 | 0.0000E+00 | 0.0000E+00 | 0.0000E+00 | 0.0000E+00 |
| B: | 7.4122E−01 | 2.8696E+00 | −1.0905E−01 | −1.0164E+00 | −6.1392E−01 |
| C: | −1.5171E+00 | −1.7978E+01 | 2.0848E+00 | 4.6755E+00 | −4.7212E−02 |
| D: | 4.4726E+00 | 1.2952E+02 | −7.0436E+01 | −3.3477E+01 | 7.2859E+00 |
| E: | −9.6827E+00 | −5.9990E+02 | 9.9692E+02 | 1.7067E+02 | −3.6905E+01 |
| F: | 1.3548E+01 | 1.6926E+03 | −7.6908E+03 | −5.8013E+02 | 9.2389E+01 |
| G: | −1.0212E+01 | −2.4557E+03 | 2.9849E+04 | 1.0959E+03 | −1.1887E+02 |
| H: | 2.4194E+00 | 1.2410E+03 | −4.6528E+04 | −8.9817E+02 | 6.2497E+01 |

| surface | 8 | 9 | 10 | 11 | 12 |
|---|---|---|---|---|---|
| K: | −4.8127E+00 | −2.4282E+01 | −1.4668E+00 | −1.8734E+01 | −3.9655E+00 |
| A: | 0.0000E+00 | 0.0000E+00 | 0.0000E+00 | 0.0000E+00 | 0.0000E+00 |
| B: | −4.7312E−01 | 3.1428E−02 | 8.3456E−01 | 8.0934E−02 | −1.2595E−01 |
| C: | 1.1240E+00 | 2.6432E−01 | −3.0293E+00 | −7.2186E−01 | −1.1838E−02 |
| D: | −1.8261E+00 | −1.6831E+00 | 6.5037E+00 | 1.0485E+00 | 6.6870E−02 |
| E: | 2.7404E+00 | 5.1932E+00 | −9.0061E+00 | −9.1069E−01 | −5.2355E−02 |
| F: | −3.9682E+00 | −8.0880E+00 | 7.6359E+00 | 4.6172E−01 | 2.0147E−02 |
| G: | 4.1877E+00 | 6.2705E+00 | −3.4498E+00 | −1.2060E−01 | −3.9720E−03 |
| H: | −1.8878E+00 | −1.9368E+00 | 6.2661E−01 | 1.2487E−02 | 3.1732E−04 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 1.74 | f5/f4 | −1.286 |
| Fno | 2.25 | CT4/CT3 | 3.608 |
| FOV[deg.] | 111.87 | CT2/CT3 | 2.375 |
| CT4/(CT1 + CT3 + CT5) | 1.097 | CT5/CT3 | 1.334 |
| (CT1 + CT5)/CT3 | 2.289 | CT4/CT1 | 3.776 |
| f/f4 | 1.527 | IMH/f2345 | 1.545 |
| f/f2345 | 1.171 | IMH/f | 1.319 |
| f3/f4 | −4.262 | f/BFL | 1.611 |

In the present five-piece optical lens system with a wide field of view, the lens elements can be made of plastic or glass. If the lens elements are made of plastic, the cost will be effectively reduced. If the lens elements are made of glass, there is more freedom in distributing the refractive power of the five-piece optical lens system with a wide field of view. Plastic lens elements can have aspheric surfaces, which allow more design parameter freedom (than spherical surfaces), so as to reduce the aberration and the number of the lens elements, as well as the total track length of the five-piece optical lens system with a wide field of view.

In the present five-piece optical lens system with a wide field of view, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The five-piece optical lens system with a wide field of view of the present invention can be used in focusing optical systems and can obtain better image quality. The five-piece optical lens system with a wide field of view of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A five-piece optical lens system with a wide field of view, comprising a stop and a lens group having five lens elements, in order from an object side to an image side, comprising:
   a first lens element with a negative refractive power, having an object-side surface being convex near an optical axis and an image-side surface being concave near the optical axis, at least one of the object-side surface and the image-side surface of the first lens element being aspheric;
   the stop;
   a second lens element with a positive refractive power, having an object-side surface being convex near the optical axis and an image-side surface being convex near the optical axis, at least one of the object-side surface and the image-side surface of the second lens element being aspheric;
   a third lens element with a negative refractive power, having an object-side surface being convex near the optical axis and an image-side surface being concave near the optical axis, at least one of the object-side surface and the image-side surface of the third lens element being aspheric;
   a fourth lens element with a positive refractive power, having an object-side surface being concave near the optical axis and an image-side surface being convex near the optical axis, at least one of the object-side surface and the image-side surface of the fourth lens element being aspheric; and
   a fifth lens element with a negative refractive power, having an object-side surface being convex near the optical axis and an image-side surface being concave near the optical axis, at least one of the object-side surface and the image-side surface of the fifth lens element being aspheric and provided with at least one inflection point;
   wherein a central thickness of the first lens element along the optical axis is CT1, a central thickness of the third lens element along the optical axis is CT3, a central thickness of the fourth lens element along the optical axis is CT4, a central thickness of the fifth lens element along the optical axis is CT5, a focal length of the third lens element is f3, a focal length of the fourth lens element is f4, a distance from the image-side surface of the fifth lens element to an image plane along the optical axis is BFL, a focal length of the five-piece optical lens system with a wide field of view is f, and they satisfy the relations: $0.69 < CT4/(CT1+CT3+CT5) < 1.32$, $1.83 < (CT1+CT5)/CT3 < 4.06$, $-6.167 \leq f3/f4 \leq -5.388$, and $1.11 < f/BFL < 2.22$, or they satisfy the relations: $0.69 < CT4/(CT1+CT3+CT5) < 1.32$, $1.83 < (CT1+CT5)/CT3 < 4.06$, $-28.92 < f3/f4 \leq -24.097$, and $1.11 < f/BFL < 2.22$.

2. The five-piece optical lens system with a wide field of view as claimed in claim 1, wherein the focal length of the five-piece optical lens system with a wide field of view is f, the focal length of the fourth lens element is f4, and they satisfy the relation: $1.14 < f/f4 < 1.96$.

3. The five-piece optical lens system with a wide field of view as claimed in claim 1, wherein a focal length of the second lens element, the third lens element, the fourth lens element and the fifth lens element combined is f2345, the focal length of the five-piece optical lens system with a wide field of view is f, and they satisfy the relation: $0.91 < f/f2345 < 1.46$.

4. The five-piece optical lens system with a wide field of view as claimed in claim 1, wherein the focal length of the fourth lens element is f4, a focal length of the fifth lens element is f5, and they satisfy the relation: $-1.63 < f5/f4 < -0.87$.

5. The five-piece optical lens system with a wide field of view as claimed in claim 1, wherein the central thickness of the fourth lens element along the optical axis is CT4, the central thickness of the third lens element along the optical axis is CT3, and they satisfy the relation: 2.89<CT4/CT3<4.82.

6. The five-piece optical lens system with a wide field of view as claimed in claim 1, wherein a central thickness of the second lens element along the optical axis is CT2, the central thickness of the third lens element along the optical axis is CT3, and they satisfy the relation: 1.9<CT2/CT3<3.36.

7. The five-piece optical lens system with a wide field of view as claimed in claim 1, wherein the central thickness of the fifth lens element along the optical axis is CT5, the central thickness of the third lens element along the optical axis is CT3, and they satisfy the relation: 1.07<CT5/CT3<2.69.

8. The five-piece optical lens system with a wide field of view as claimed in claim 1, wherein the central thickness of the fourth lens element along the optical axis is CT4, the central thickness of the first lens element along the optical axis is CT1, and they satisfy the relation: 2.64<CT4/CT1<4.53.

9. The five-piece optical lens system with a wide field of view as claimed in claim 1, wherein a focal length of the second lens element, the third lens element, the fourth lens element and the fifth lens element combined is f2345, half of an image height that can be captured by the five-piece optical lens system with a wide field of view on an image plane is IMH, and they satisfy the relation: 1.21<IMH/f2345<1.94.

10. The five-piece optical lens system with a wide field of view as claimed in claim 1, wherein the focal length of the five-piece optical lens system with a wide field of view is f, half of an image height that can be captured by the five-piece optical lens system with a wide field of view on an image plane is IMH, and they satisfy the relation: 1.06<IMH/f<1.59.

* * * * *